(12) United States Patent
Chen et al.

(10) Patent No.: US 7,034,946 B2
(45) Date of Patent: Apr. 25, 2006

(54) FIBER OPTIC GYROSCOPE SENSING LOOP DOUBLER

(75) Inventors: Chung-Jen Chen, Phoenix, AZ (US); Lee K. Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 334 days.

(21) Appl. No.: 10/429,729

(22) Filed: May 6, 2003

(65) Prior Publication Data
US 2004/0223160 A1    Nov. 11, 2004

(51) Int. Cl.
G01C 19/72    (2006.01)

(52) U.S. Cl. ...................................... 356/466
(58) Field of Classification Search ................ 356/460, 356/462–464, 466
See application file for complete search history.

(56) References Cited

U.S. PATENT DOCUMENTS

| | | | | |
|---|---|---|---|---|
| 4,323,310 A | * | 4/1982 | Shaw et al. | 356/461 |
| 4,329,056 A | * | 5/1982 | Lacombat et al. | 356/460 |
| 4,585,347 A | * | 4/1986 | Auch et al. | 356/460 |
| 5,106,193 A | * | 4/1992 | Fesler et al. | 356/460 |
| 5,137,356 A | * | 8/1992 | Malvern | 356/461 |
| 5,137,360 A | * | 8/1992 | Ferrar | 356/464 |
| 5,677,767 A | * | 10/1997 | Shirasaki et al. | 356/460 |
| 6,744,519 B1 | * | 6/2004 | Lange et al. | 356/464 |

OTHER PUBLICATIONS

Herdman, C.T., Fiber-Optic Gyroscopes, Scientific Honeyweller, Honeywell's Corporate, Minneapolis, MN, USA, 1996, pp. 88-95.

* cited by examiner

*Primary Examiner*—Hwa (Andrew) Lee
*Assistant Examiner*—Patrick Connolly
(74) *Attorney, Agent, or Firm*—Kurt A. Luther

(57) ABSTRACT

A fiber optic ring interferometer, such as an interferometric fiber optic gyro (IFOG), with a sensing loop doubler. The IFOG device includes a light source, a circulator in optical communication with the light source and a photo diode, an integrated optical chip (IOC) capable of splitting light emitted from the circulator into two paths each of which is capable of being modulated, the IOC further being capable of combining light from each of the two paths when light travels in a direction towards the circulator, a fiber coil, and a polarization maintaining (PM) combiner/splitter disposed in between the IOC and the fiber coil. The PM combiner/splitter operates to send light through the fiber coil a first time in a first polarization state and to subsequently send the same light a second time through the fiber coil in a second orthogonal polarization state, whereby light travels twice the distance compared to a single loop IFOG device and, as such, effectively doubles the LD product.

33 Claims, 7 Drawing Sheets

Polarization Beam Splitter

Polarization Beam Splitter

FIBER OPTIC GYROSCOPE SENSING LOOP DOUBLER

BACKGROUND

1. Field of the Invention

The present invention relates to interferometric fiber optic gyroscopes (IFOGs). More particularly, the present invention relates to an IFOG having double the sensitivity, reduced angle random walk (ARW), and increased bias stability compared to an IFOG having the same fiber coil length and loop diameter. The present invention also relates to an IFOG that has the same gyro performance of a conventional IFOG, but that uses only half the fiber coil length of the conventional device.

2. Background of the Invention

As is well-known, in an interferrometric fiber optic gyroscope (IFOG), an optical fiber is wound in a circular or looped shape and acts as a sensing device to detect a Sagnac phase difference for two counter-propagating waves in presence of rotation. The product of the length and diameter (LD product) of the wound fiber sensing-coil determines, to a large degree, the sensitivity of the gyroscope. Generally speaking, the greater the LD product, the greater the sensitivity and stability of the device, and the lower the random noise. However, large coil volume resulting from greater fiber length or larger loop diameter (to achieve a higher LD product) requires increasingly bulky packages for the gyroscope device, especially when compared to other technologies such as the ring laser gyroscope (RLG) or hemisphere resonant gyroscope (HRG).

BRIEF SUMMARY OF THE INVENTION

It is therefore an object of the present invention to improve the performance of an IFOG device without increasing its LD product by physically increasing dimensions, or, alternatively, to maintain the performance of a given IFOG device, but doing so with approximately only half the fiber coil length. The present invention is based on a new technique that routes light inside the fiber coil twice in two orthogonal polarization states, respectively. The polarization-state of the traveling light is preferably controlled by a polarization-maintaining (PM) combiner/splitter. This technique either doubles the sensitivity, and reduces the angle random walk (ARW) and bias instability with the same fiber coil length, or maintains the gyro performance of a given IFOG using only half of fiber coil length.

More specifically, polarization maintaining combiner/splitters are used to couple only one polarization state of light in and out of the fiber coil. The light traveling inside the fiber is rotated 90 degrees after one pass by using a 90 degree splice on the PM fiber coil. Light is then routed back to the fiber coil through the PM combiner/splitter for a second pass through the coil. After the second pass, the light is again rotated 90 degrees back to the original polarization state, and coupled out through the PM combiner/splitter to a phase modulator such as integrated optics chip (IOC). At least two embodiments using PM combiner/splitters can be implemented to achieve the functionality described. One embodiment uses only one PM combiner/splitter and one 90 degree splice. A second embodiment uses two PM combiner/splitters and one 90 degree splice. The first embodiment is relatively simple and requires minimal change to optical circuits. The second embodiment has more symmetry and is not subject to the drift of the PM combiner/splitter because the light travels along both the cross and through legs of the each PM combiner/splitter once.

A third embodiment relies not on PM combiner/splitters, but instead on a polarization beam splitter that can be implemented using, for example, bulk optics.

In an implementation of the present invention, an IFOG test bed with a single sensing loop was assembled first for establishing baseline performance. The proper frequency was measured at 24.6 kHz, and bias data were taken with ARW at about 500 μdeg/rt-hr. The test bed was then modified, in accordance with the first embodiment of the present invention, for achieving a doubled sensing loop by incorporating a Polarization Maintaining (PM) combiner/splitter and applying at least one 90° splice to redirect light in fast and slow axes. Fast and slow axes are the two principal axes of PM fiber, in which light travels faster (slower) in the fast (slow) axis with smaller (larger) index of refraction. The double pass through the sensing loop was verified by the proper frequency measured at about 12.3 kHz, half of that of the single loop configuration. In other words, the loop-transit time (the time for light to travel from one side of an Integrated Optical Chip (IOC) through fiber coil to the other side of the IOC) doubles in the double sensing loop configuration. The bias data was measured with ARW at about 300 μdeg/rt-hr. Thus, the ARW result shows about 40% improvement compared to the single loop ARW measurement. The difference from the theoretical 50% improvement is due to the increase of the thermal phase noise for twice the fiber path.

A more complete understanding of the present invention can be gleaned from the following detailed description in combination with the accompanying drawings.

DETAILED DESCRIPTION OF THE INVENTION

A detailed description of the present invention is set forth below in four sections. In section I, the structure of the sensing doubler is described. Section II shows measurements of a typical fused type of PM combiner/splitter. An optical test bed assembly is described in section III. Testing results of the sensing loop doubler and comparison with a single loop configuration are discussed in section IV. Finally, in section V, a second embodiment of the present invention is described.

I. Structure of the Sensing Loop Doubler

Figure 1:
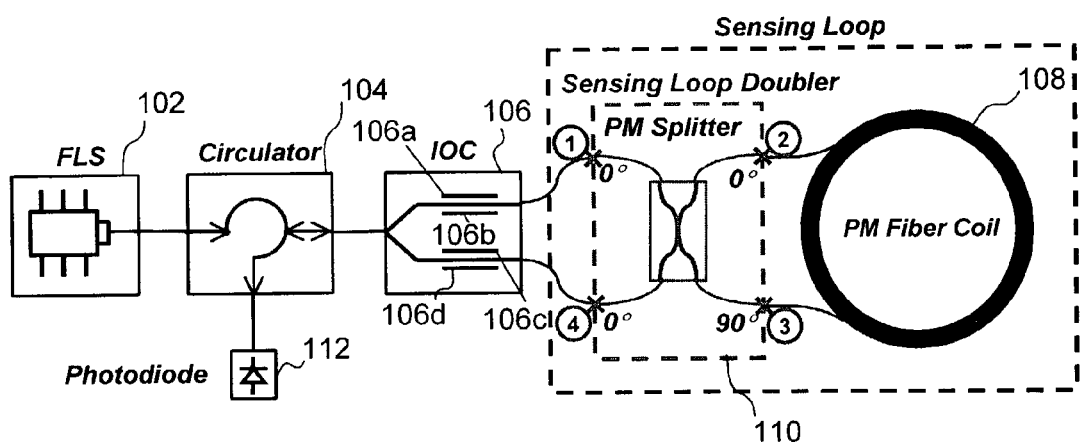
FIG. 1 is a schematic of a first embodiment of an IFOG sensing loop doubler in accordance with the present invention.

One way of effectively doubling the sensing loop (and thus the LD product), in accordance with the present invention, is to manage the polarization-state of the traveling light such that it will propagate inside PM fiber twice in two orthogonal states, respectively. FIG. 1 depicts the configuration of an exemplary IFOG sensing loop doubler device. It differs from a single loop configuration by including an extra PM Combiner/Splitter 110 in addition to at least one 90° splice for redirecting light into fast or slow axes. The function of PM Combiner/Splitter 110 is to control the light polarization into specific output ports. Fiber light source (FLS) 102 provides light to circulator (or 50/50 coupler) 104. An integrated optics chip (IOC) (or 50/50 coupler) 106 then splits the light into two counter-propagating waves that travel through the fiber coil 108. After the counter-propagating waves re-emerge from fiber coil 108, they interfere at the left end of IOC 106 and travel back again through circulator 104 and exit to a photodiode 112. With the proper modulation applied via IOC electrodes 106a–d, signals from photodiode 112 can be demodulated to detect the proper frequency and rotation rate, as is well known in the art.

Figure 2:
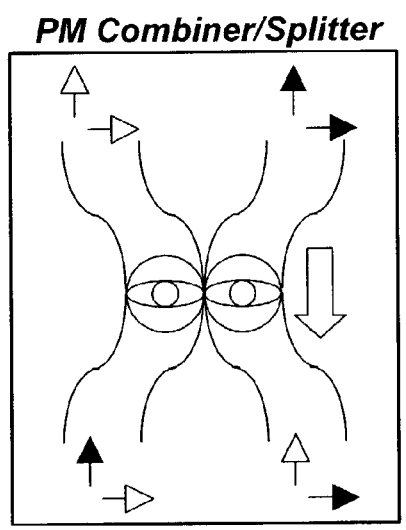
FIG. 2 illustrates the polarization configuration of the PM combiner/splitter in accordance with the present invention.

In a single sensing loop configuration, there is no Polarization Maintaining (PM) Combiner/Splitter 110, as there is in the preferred configuration of the present invention. In a conventional sensing loop, the counter-propagating waves pass through a fiber coil only once, and exit through an IOC. By adding PM Combiner/Splitter 110, it is possible to control the cross and through exit of the light based on the polarization of the incident light. In a preferred implementation, PM Combiner/Splitter 110 can be made by fusing two PM fibers together. Alternatively, PM Combiner/Splitter 110 can be made by pressing two fibers together after polishing, or can be made using free-space micro-optics. Depending on the configuration of PM Combiner/Splitter 110, incident light with 0° polarization direction will go across (through) PM Combiner/Splitter 110, while 90° polarization incident light will go through (across) the PM Combiner/Splitter, as shown in FIG. 2.

Figure 3:
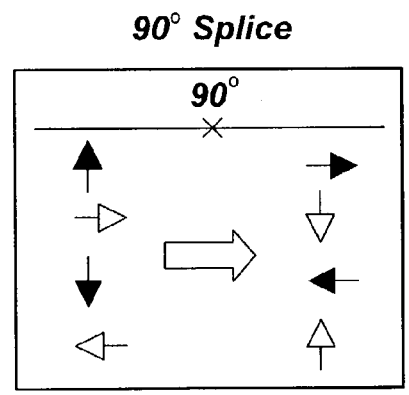
FIG. 3 shows the polarization configuration of a 90 degree splice on PM fibers.

The polarization of the light traveling inside PM fiber can be changed by splicing techniques. For example, the light polarization can be changed by 180° by breaking the fiber and splicing it back together at 180°. The light can also be rotated 90° with a 90° splice of PM fibers, similar to a half wave plate to rotate light by 90°. FIG. 3 shows the polarization configuration of a 90° splice following the right-hand rule. The left-hand rule can also be achieved by splicing the fibers to achieve a −90° orientation.

Figure 4:
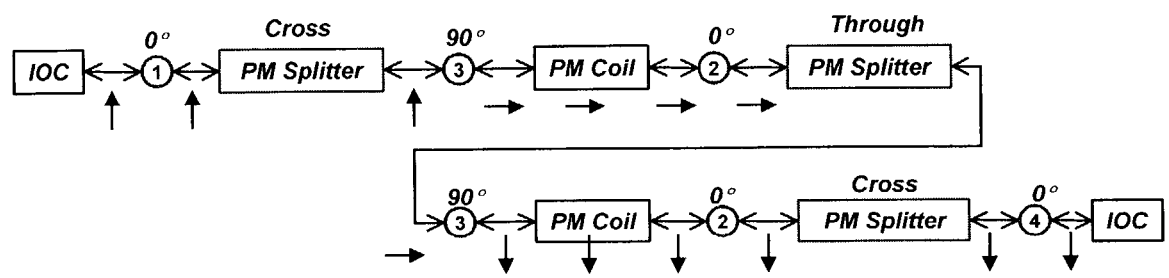
FIG. 4 shows the optical path and polarization state of light traveling through the doubler device according to the first embodiment of the present invention.

FIG. 4 shows the optical path and polarization state of light traveling through the doubler device. Assume the light coming out of the upper path IOC 106 has a polarization direction at 0° (counter-clockwise wave). At the 0° splice #1, the light is maintained at 0° polarization. It then goes cross PM Combiner/Splitter 110, and exits through splice #3. The 90° splice at #3 rotates the polarization 90°. It travels through fiber coil 108 and splice #2 without changing the polarization direction at 90°. This time, because the polarization direction is 90°, light goes through the PM splitter and exits at splice #3 again. It travels back through the fiber coil for a second time, but with polarization direction at 180°. When it exits the fiber coil, it goes across the PM Combiner/Splitter and exits at splice #4 toward the lower path of IOC 106. The light trace for the clockwise wave is similar to the counter-clockwise wave described above. These two waves meet together again at the left end of IOC 106, but, in accordance with the present invention, each wave has traveled twice inside the fiber coil.

II. PM Combiner/Splitter Measurement

A PM Combiner/Splitter was obtained for evaluation of its polarization performance. Two device samples were obtained from SIFAM Fibre Optics Limited (Torquay, Devon, England). Data for the SIFAM PM Combiner/Splitters is shown in Tables 1 and 2.

Measurement of extinction ratio and isolation ratio were performed for each sample. The extinction ratio is a measure of the polarization error out of the same output port with maximum output. The isolation ratio is a measure of the light leakage on the other output port. For the extinction ratio measurement, polarized light is incident on an input port (e.g., A), and the output port (e.g., X) is measured through a polarizer. The incident light and polarizer are adjusted such that the maximum light output is obtained. The polarizer is then rotated by 90°. The ratio of the two results determines the extinction ratio. The same procedure is applied for different input ports and output ports to obtain all the extinction ratios.

Samples of the SIFAM device show good extinction with an average of about 30 dB. This high extinction ratio is sufficient to ignore the polarization error due to the PM Splitter/Combiner because the PM fiber coil has higher polarization error, or lower extinction ratio (17.8 dB in a measurement on 4 km of fiber).

The same procedure for measuring the extinction ratio is followed for measuring the isolation ratio. After the maximum output at the exit port is obtained, the other exit ports are measured for leakage light. The ratio of the two results determines the isolation ratio. In the design of a PM Combiner/Splitter suitable for use in the present invention, the slow axis is the pass through axis. If there is incident light on the slow axis, there is higher isolation ratio on the through exit port than the cross exit port. If the incident light is on the fast axis, there is maximum light output on the cross exit port. The smaller isolation ratio on the fast axis gives more leakage on the through exit port. In other words, the slow axis isolation ratio is better than that of the fast axis.

In the SIFAM PM Combiner/Splitter isolation ratio measurement, there is a larger difference on the slow and fast axes. This is believed to be due to the wavelength difference between the FLS employed and the optimized wavelength in the manufacturing of the PM Combiner/Splitter. A fused type of PM Combiner/Splitter typically shows better stability over temperature and humidity compared to the polished type.

It is noted that free-space micro-optics can also be used to fabricate PM combiner/splitter in combination with other optical components to obtain a the compact package.

TABLE 1

SIFAM PM Combiner/Splitter Measurement Data (Sample 1)

| Input Port | Output Port | Extinction Ratio (dB) | Input Polarization | Isolation Ratio (dB) |
|---|---|---|---|---|
| A | X | 32.2 | Fast Axis | 10.7 |
|   | Y | 32.5 | Slow Axis | 29.2 |
| B | Y | 31.5 | Slow Axis | 29.0 |
|   | X | 34.1 | Fast Axis | 11.1 |
| X | A | 30.3 | Fast Axis | 10.9 |
|   | B | 31.1 | Slow Axis | 30.3 |
| Y | B | 29.6 | Slow Axis | 30.2 |
|   | A | 30.8 | Fast Axis | 11.0 |

TABLE 2

SIFAM PM Combiner/Splitter Measurement Data (Sample 2)

| Input Port | Output Port | Extinction Ratio (dB) | Input Polarization | Isolation Ratio (dB) |
|---|---|---|---|---|
| A | X | 29.8 | Fast Axis | 14.2 |
|   | Y | 30.8 | Slow Axis | 27.4 |
| B | Y | 29.8 | Slow Axis | 26.7 |
|   | X | 29.2 | Fast Axis | 14.1 |
| X | A | 32.0 | Fast Axis | 14.0 |
|   | B | 30.3 | Slow Axis | 26.7 |
| Y | B | 29.7 | Slow Axis | 26.9 |
|   | A | 32.8 | Fast Axis | 14.3 |

III. Test Bed Assembly

A test bed was assembled for demonstrating the sensing loop doubler illustrated schematically in FIG. 1. FLS 102 has an average wavelength of about 1550 nm and a bandwidth of 29.4 nm. IOC 106 has a channel length of 47 mm. PM fiber coil 108 comprised PM fiber of about 4 km in length. Underneath the coil was a rubber mat to prevent vibration, and also to serve as heat insulation from a metal plate below. All of the optical components were covered with a metal cover to prevent air flow, and thereby help to stabilize the temperature of the optical components.

Figure 5:
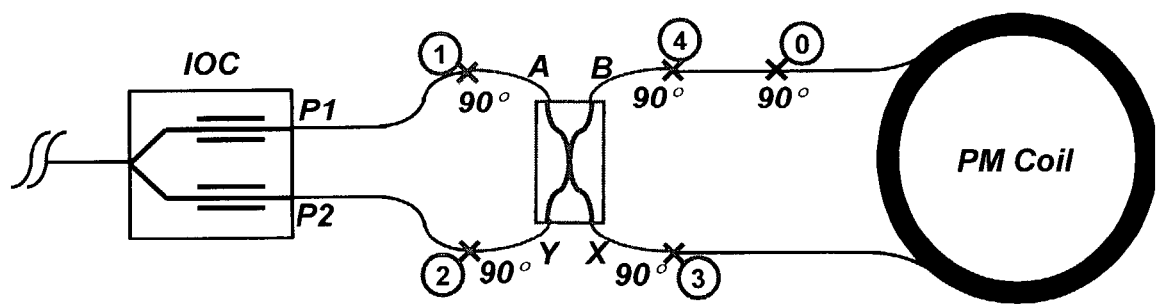
FIG. 5 shows a splicing configuration of a variation of the first embodiment on which experiments were conducted.

More specifically, with reference to FIG. 5 (a variation of the first embodiment in which the splices are all 90°), the procedure for splicing PM Combiner/Splitter 110 to the coil fiber and pigtail of IOC 106 is shown. Point #1 is spliced first, followed by points #2, #3, and #4 subsequently. The sequence can be chosen differently as long as good splices with the aid of the monitoring system can be made. The high isolation ratio (29.2 dB from Table 1) limits the light leakage back to IOC before entering PM fiber coil 108. It reduces the interfered error caused by this straight pass-through leakage. It is noted that different combination of 0° or 90° could be used as long as the resulting configuration routes the light back into the sensing fiber for the second path. That is, the 90° splice (in FIG. 1, for example, need not necessarily be located at splice #3, but could be located elsewhere, as long as the result is that light is routed twice around the sensing fiber as a result of differences in polarization states.

More specifically, for the first embodiment, since 0 deg polarization light will go cross leg, and 90 deg polarization will go through the same leg (which is preferred because of fewer 90 degree splices), then the following splices are possible.

Splice 1, 0 deg;
Splice 2, 0 deg;
Splice 3, 90 deg;
Splice 4, 0 deg
or
Splice 1, 0 deg;
Splice 2, 90 deg;
Splice 3, 0 deg;
Splice 4, 0 deg If the PM Combiner/Splitter legs 1 and 2 are swapped (or legs 3 and 4 are swapped) then the following is also possible:
Splice 1, 90 deg;
Splice 2, 0 deg;
Splice 3, 90 deg;
Splice 4, 90 deg
or
Splice 1, 90 deg;
Splice 2, 90 deg;
Splice 3, 0 deg;
Splice 4, 90 deg Also, it is noted that the PM Combiner/Splitter can be anywhere inside the fiber coil (although the described location between the coil and IOC is relatively simple to implement). Likewise, the 90 degree splice on either splice 2 or splice 3 can also be anywhere inside the fiber coil.

The measurement of splice loss and extinction (isolation) ratio was measured upon splicing PM Combiner/Splitter 110 with coil fiber 108 and IOC 106. Measurement indicates that coil fiber 108 has a loss of 5.12 dB and an extinction ratio of 17.8 dB. Polarization error causes light leakage to cross PM splitter before entering coil fiber 108 for the second pass. Single loop leakage has its own interferrogram, which is different from the one in the double loop configuration. The light leakage along the single loop is larger with lower extinction ratio of PM combiner/splitter. The higher loss on the coil fiber reduces the ratio between the double loop and single loop. In the configuration in accordance with the present invention, there is about 5% of single loop leakage compared to the double loop. Fortunately, the single loop leakage cancels out in the demodulation process. Table 3 shows data reflecting splice loss and extinction (isolation) ratio for the configuration shown in FIG. 5.

TABLE 3

Measurement on splice loss and extinction (isolation) ratio.

| Splice | Port | Optical Power | Remark |
|---|---|---|---|
| Splice #1 | P1 (Pre-Splice) | −4.51 dBm (354 µW) |  |
|  | Y (Post-Splice) | −28.8 dBm (1.32 µW) | Isolation Ratio = 24.1 dB |
|  | X (Post-Splice) | −4.73 dBm (336.5 µW) | Excess Loss = 0.22 dB |
| Splice #2 | P2 (Pre-Splice) | −4.37 dBm |  |
|  | B (Post-Splice) | −4.6 dBm |  |
|  | X (Post-Splice) | −4.74 dBm |  |
| Splice #3 | X (Pre-Splice) | −4.7 dBm | Coil + Splice Loss = 5.12 dB |
|  | Coil (Pre-Splice) 90° | −11.3 dBm, −29.14 dBm | Extinction Ratio = 17.8 dB |

IV. Testing

In a preferred testing set up, a hot plate is used to control the temperature of optical components. An light source controller is used for controlling FLS 102 with constant pump current and constant temperature controller. A function generator is used to generate the modulation signal into IOC 106. Output from photo detector 112 is sent to a lock-in amplifier (LIA) for the demodulation processing. The data from the lock-in amplifier is then acquired by a data acquisition system (DAS) and saved with the rate information.

For a single loop configuration, a pump current of 67 mA is required to obtain 2V un-modulated signal at photo detector 112. After initial set up, the proper frequency was measured first. An oscilloscope was used to measure the output of photo detector 112. IOC 106 was driven with π/2 square wave modulation. In addition to the bias modulation, a sinusoidal wave with 64-times the proper frequency measurement was applied as the eigen-frequency modulation (EFM) signal. The bias frequency (and EFM frequency, accordingly) was adjusted to obtain the minimum side lobes on the spectrum analyzer at the EFM frequency. The proper frequency was measured at about 24.6 kHz.

Figure 6A:
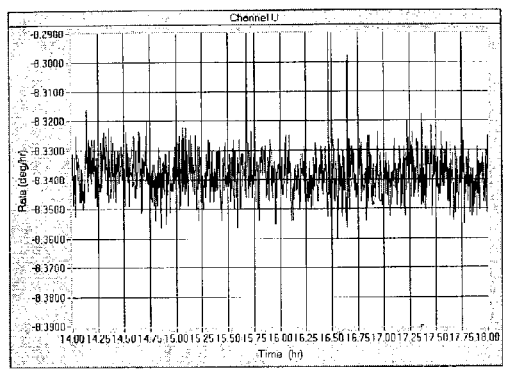
FIGS. 6A and 6B show, respectively, bias measurement and cluster analysis for a single loop configuration with data taken at 8 second intervals.
Figure 6B:
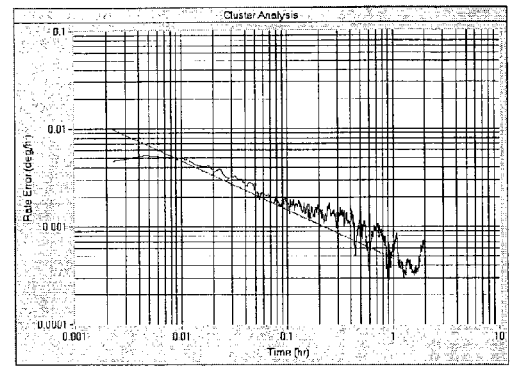

After the proper frequency measurement, the gyro was stabilized in a temperature-controlled oven for about two days, in preparation for the bias measurement. The bias data was taken when square-wave modulated at π/2. The bias data is shown in FIG. 6A. FIG. 6B shows the cluster analysis with ARW calculated at about 500 μdeg/rt-hr. Bias stability was better than 0.001 deg/hr.

Figure 7A:
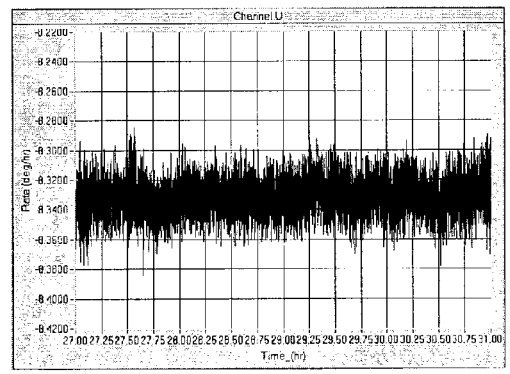
FIGS. 7A and 7B show, respectively, bias measurement and cluster analysis for the double loop configuration in accordance with the present invention with data taken at 1 second intervals.
Figure 7B:
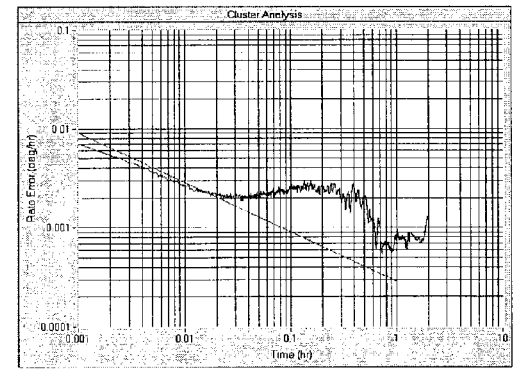

For the double loop configuration, the pump current required to reach 2V un-modulated signal was 174 mA. FIG. 7A shows bias measurement again square-wave modulated at π/2 and FIG. 7B shows the cluster analysis for the double loop configuration. The ARW was calculated to be about 300 μdeg/rt-hr, which is about a 40% improvement compared to the single loop configuration. Lower than expected bias stability, about 0.003 deg/hr, was obtained. It is believed that the instability could be due to single loop leakage because of the low extinction ratio of PM coil fiber 108. It could also be due to the extra length of PM Combiner/Splitter 110 arranged before the sensing coil.

V. Second Embodiment

Figure 8:
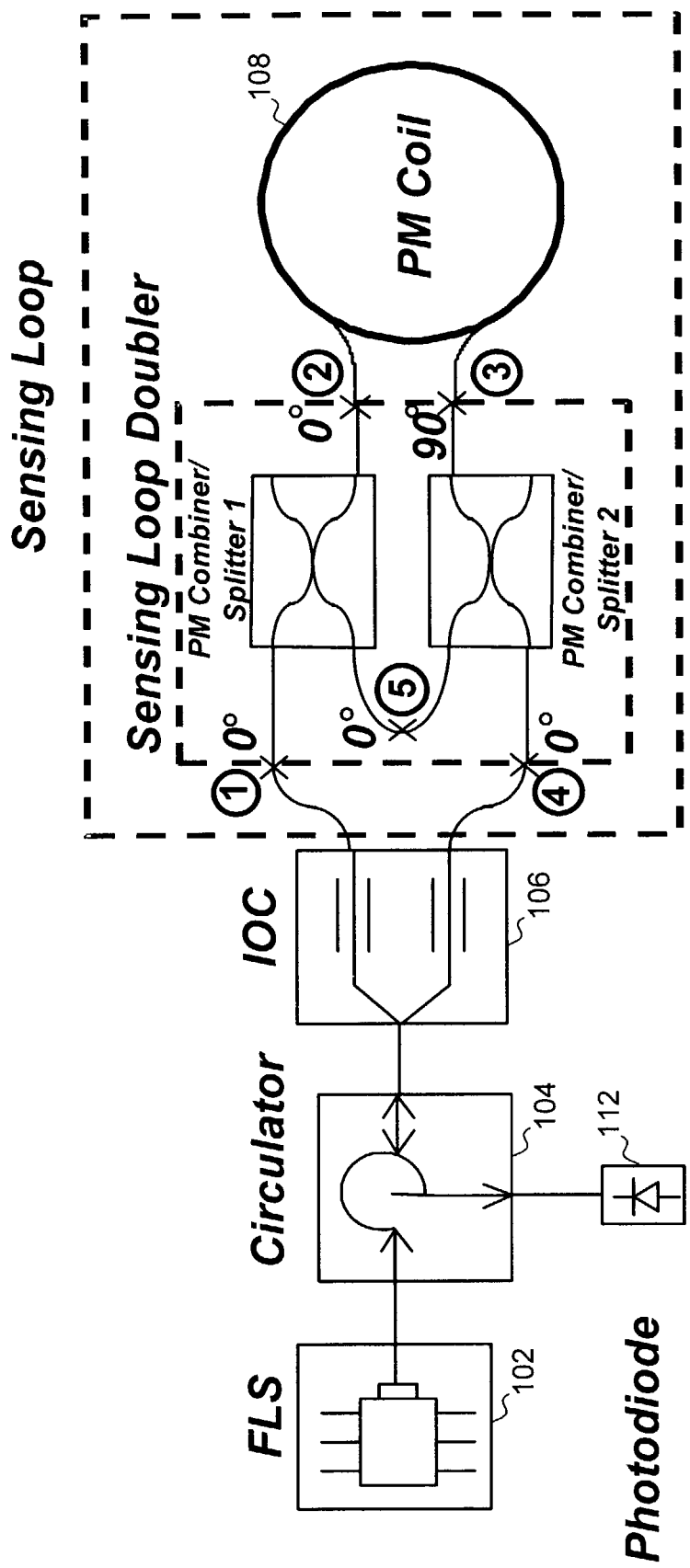
FIG. 8 shows a second embodiment including two PM Combiner/Splitters in accordance with the present invention.
Figure 9:
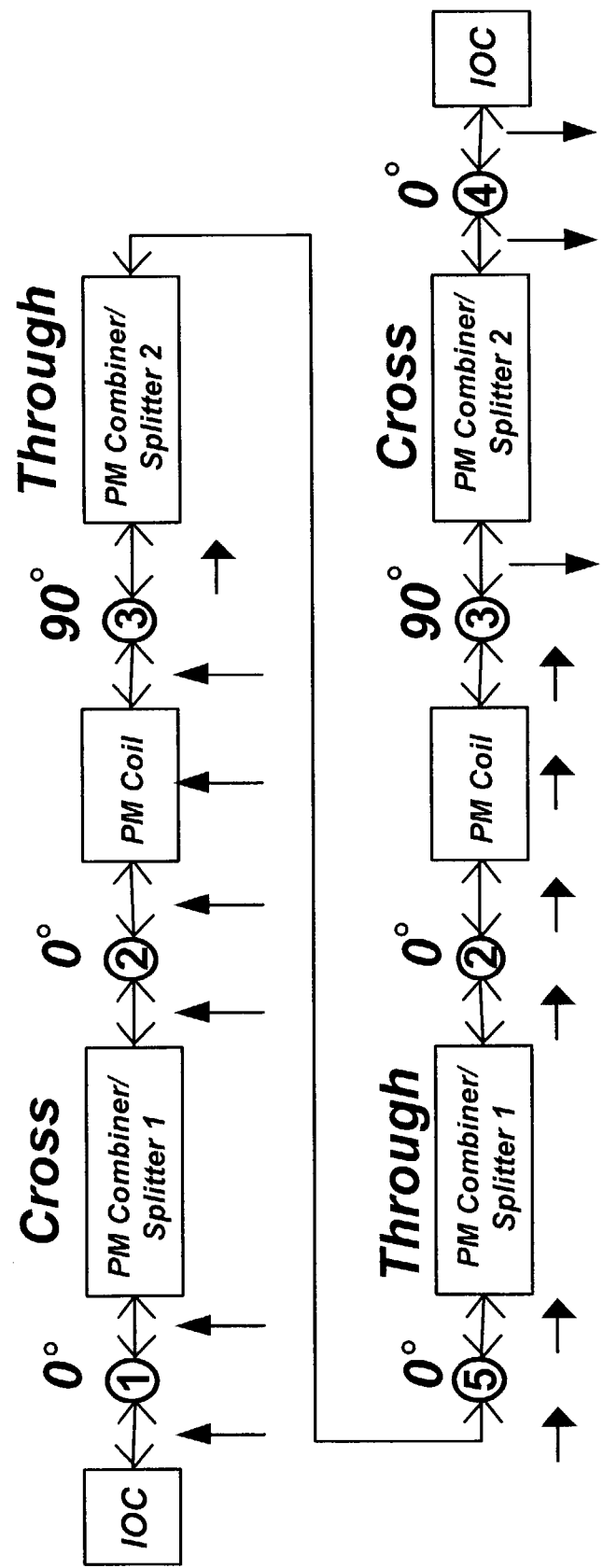
FIG. 9 shows the optical path and polarization state of light traveling through the doubler of the second embodiment of the present invention.

FIGS. 8 and 9 illustrate a second embodiment of the present invention in which a pair of PM Combiner/Splitters are employed to achieve a sensing loop doubler. Here, a symmetric PM Coupler/Splitter configuration is achieved and light travels through and cross legs twice for each of the PM Coupler/Splitters. This provides a more balanced configuration.

Possible splices configuration for the symmetric configuration according to the second embodiment include the following:

Since 0 deg polarization light will go cross leg, and 90 deg polarization will go through the same leg (which is preferred because of fewer 90 degree splices), the following are possible splice arrangements:

Splice 1, 0 deg;
Splice 2, 0 deg;
Splice 3, 90 deg;
Splice 4, 0 deg;
Splice 5, 0 deg or Splice 1, 0 deg;
Splice 2, 90 deg;
Splice 3, 0 deg;
Splice 4, 0 deg;
Splice 5, 0 deg If the PM Combiner/Splitter legs 1 and 2 are swapped (or 3 and 4 are swapped), both splice 1 and 4 are preferably 90 degree splices, splice 5 is 0 deg, splice 3 or splice 4 are 90 degrees.

If splice 2 (or 3) goes to the other leg of PM Combiner/Splitter, Splice 2 and 3 are 0 deg, Splice 5 is 90 deg, Splice 1 (or 4) are 90 deg.

VI. Third Embodiment

Figure 10A:
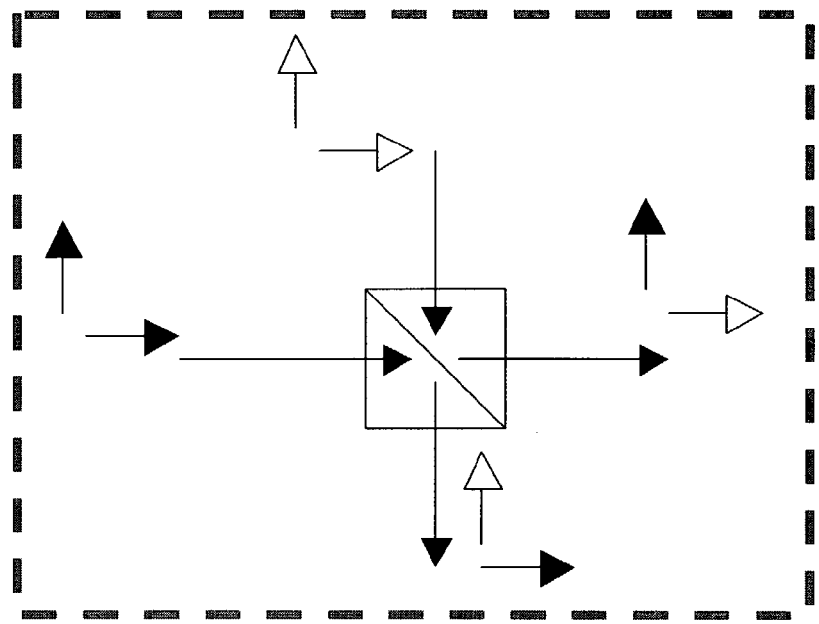
FIGS. 10A and 10B illustrate a polarization beam splitter that can be used instead of a PM Combiner/Splitter, in accordance with a third embodiment of the present invention.
Figure 10B:
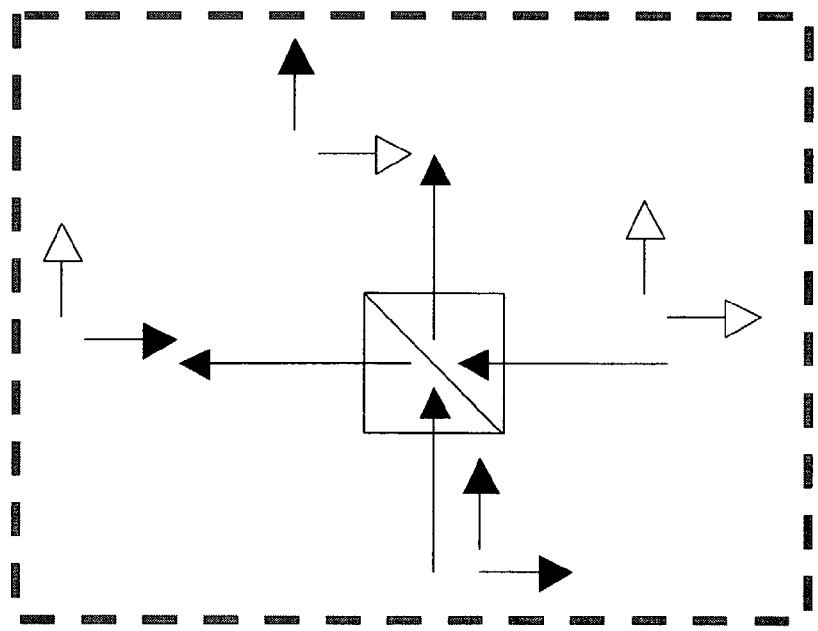
Figure 11:
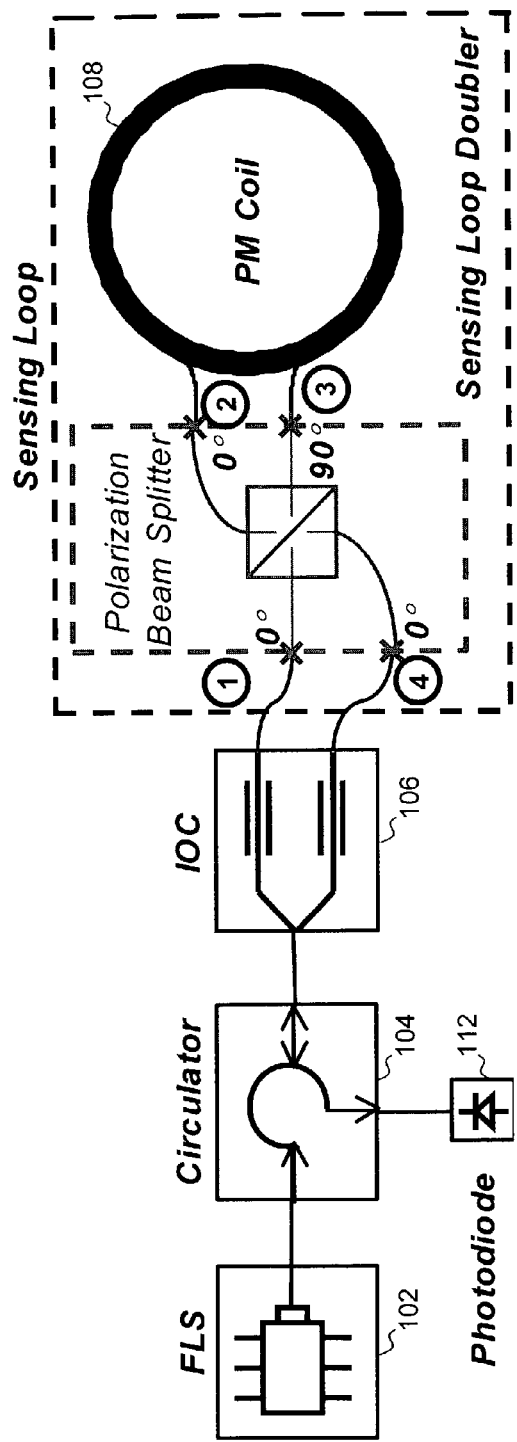
FIGS. 11 and 12 illustrate how the polarization beam splitter is employed in the same general architecture as that of the first embodiment, in accordance with the present invention.
Figure 12:
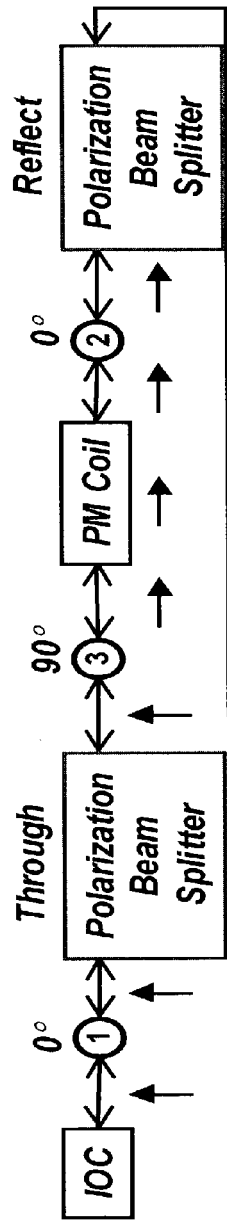
Figure 12:
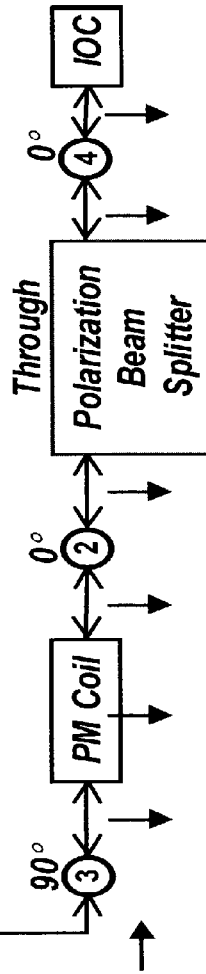

FIGS. 10–12 illustrate a third embodiment of the present invention. Here, instead of employing one or more PM Combiner/Splitters, sensing loop travel doubling can be achieved using a polarization beam splitter that can be implemented using, for example, bulk optics. Alternatively, polarization beam splitter could be implemented using micro optics technique, which could integrate other components such as the circulator, coupler or IOC, among others.

Referring to FIGS. 10A and 10B, the function of the polarization beam splitter is similar to the PM Combiner/Splitter. It allows one polarization state to pass through the splitter, and the other perpendicular polarization state to be reflected back at the interface via total internal reflection.

The polarization beam splitter can be made using two optical materials with different indexes of refraction. The refraction index is chosen such that one polarization of the 45° incident light on the interface passes through, and the other reflects back at the interface.

FIGS. 11 and 12 illustrate how the polarization beam splitter can be employed in the same general architecture as that of the first embodiment of the present invention that comprises a single PM Combiner/Splitter, as shown in FIGS. 1 and 4.

In view of the foregoing, those skilled in the art will appreciate that it is possible, in accordance with the present invention, to increase the sensitivity of an IFOG without increasing its LD product in a physical sense. Alternatively, it is possible, in accordance with the present invention, to halve the LD product of a conventional IFOG device, yet still maintain the same performance sensitivity.

Moreover, the present invention can be used on both low cost, low accuracy gyros and higher cost, higher accuracy gyros. Therefore, in some implementations a circulator and/or IOC may be eliminated. Also, the present invention should be considered applicable to any type of sensor, that uses a ring interferometer. That is, the invention is not limited to IFOG devices.

Also, as mentioned previously, circulator 104 can be replaced with any device that combines or splits light waves, such as a fiber coupler or a free-space micro-optic beam splitter that is part of a highly integrated, multi-function, optic-optic device. Similarly, IOC 106 could also be replaced by a fiber optic coupler or possibly a micro-optic device.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A fiber optic ring interferometer comprising:
    a light source;
    a fiber coil having two ends, each being fed light from the light source; and
    a combiner/splitter optically communicating with the light source and spliced to fiber of the fiber coil such that (i) at least one splice is a 90 degree splice that causes light from the light source traveling across the splice to change its polarization state and (ii) light from the light source incident on the fiber coil traverse the coil twice in different polarization states.

2. The fiber optic ring interferometer of claim 1, further comprising a circulator coupled between said light source and said fiber coil.

3. The fiber optic ring interferometer of claim 2, further comprising a photo diode in optical communication with the circulator.

4. The fiber optic ring interferometer of claim 1, further comprising an integrated optical chip (IOC) capable of splitting light from the light source into two paths each of which is capable of being modulated, the IOC further being capable of combining light from each of the two paths when light travels in a direction towards the light source.

5. The fiber optic ring interferometer of claim 1, wherein the fiber coil comprises polarization maintaining fiber.

6. The fiber optic ring interferometer of claim 1, wherein the combiner/splitter comprises polarization maintaining fiber.

7. The fiber optic ring interferometer of claim 1, wherein the fiber optic ring interferometer is an interferometer fiber optic gyro.

8. The fiber optic ring interferometer of claim 1, wherein the light source comprises a fiber light source.

9. The fiber optic ring interferometer of claim 1, wherein the fiber coil has length of about 4 km.

10. The fiber optic ring interferometer of claim 1, wherein the combiner/splitter is one of a fused type and a polished type.

11. The fiber optic ring interferometer of claim 1 wherein the combiner/splitter has an extinction ratio of at least 30 dB.

12. The fiber optic ring interferometer of claim 1, wherein the combiner/splitter has an isolation ratio of at least 10 dB.

13. The fiber optic ring interferometer of claim 1, wherein light travels through the combiner/splitter, around the fiber coil and across the combiner/splitter before returning in a direction towards the light source.

14. A device for doubling the length-diameter (LD) product of a fiber optic gyroscope (FOG), comprising:
    a polarization maintaining (PM) combiner/splitter disposed between a fiber loop of the FOG and an integrated optical chip (IOC), the PM combiner/splitter being one of a fused type and a polished type, and having four connection points, two of which are connected to the respective ends of the fiber loop and another two of which are connected to respective optical paths defined by the IOC, the PM combiner/splitter configured to change a polarization state of light from the fiber loop for each pass through the fiber loop.

15. The device of claim 14, wherein the connection points are connected by splices.

16. The device of claim 15, wherein at least one of the splices is arranged to rotate the polarization of incident light by 90 degrees.

17. The device of claim 14, wherein light emitted along one of the paths defined by the IOC travels twice around the fiber loop, the light being channeled to the fiber loop a second time by the PM combiner/splitter.

18. The device of claim 14, wherein the PM combiner/splitter has an extinction ratio of at least 30 dB.

19. The device of claim 14, wherein the PM combiner/splitter has an isolation ratio of at least 10 dB.

20. An apparatus for doubling the length-diameter (LD) product of an optical device, comprising:
    a light source;
    a circulator in optical communication with the light source and a photo diode;
    an integrated optical chip (IOC) capable of splitting light emitted from the circulator into two paths each of which is capable of being modulated, the IOC further being capable of combining light from each of the two paths when light travels in a direction towards the circulator;
    a fiber coil; and
    a polarization maintaining (PM) combiner/splitter disposed between and in optical communication with the IOC and the fiber coil, the PM combiner/splitter comprising connection points for connecting the IOC and fiber coil, the PM combiner/splitter configured to change a polarization state of light from the fiber coil for each pass through the fiber coil.

21. The device of claim 20, wherein the connection points are connected to the IOC and fiber coil by splices.

22. The device of claim 21, wherein at least on of the splices is arranged to rotate the polarization of incident light by 90 degrees.

23. The device of claim 20, wherein light emitted along one of the paths defined by the IOC travels twice around the fiber loop, the light being channeled to the fiber loop a second time by the PM combiner/splitter.

24. The device of claim 20, wherein the PM combiner/splitter has an extinction ratio of at least 30 dB.

25. The device of claim 20, wherein the PM combiner/splitter has an isolation ratio of at least 10 dB.

26. An apparatus for doubling the length-diameter (LD) product of an optical device, comprising:
    a light source;
    a circulator in optical communication with the light source and a photo diode;
    an integrated optical chip (IOC) coupled to the circulator and configured to split light emitted from the circulator into two paths each of which is capable of being modulated, the IOC further configured to combine light from each of the two paths when light travels in a direction towards the circulator, the IOC having an output;
    a fiber coil having an input; and
    a pair of polarization maintaining (PM) combiner/splitters having an input coupled to the output of the IOC and having an output coupled to the input of the fiber coil, at least one of the PM combiner/splitters configured to change a polarization state of light from the fiber coil for each pass through the fiber coil.

27. The device of claim 26, wherein the PM combiner/splitters are spiked between the IOC and fiber coil.

28. The device of claim 27, wherein at least one of the splices is arranged to rotate the polarization of incident light by 90 degrees.

29. The device of claim 26, wherein light emitter along one of the paths defined by the IOC travels twice around the fiber loop, the light being channeled to the fiber loop a second time by the pair of PM combiner/splitters.

30. A fiber optic ring interferometer, comprising:
means for providing light;
means for passing the light towards a sensing loop and for extracting light returning from the sensing loop, the means for passing and extracting light coupled to the means for providing light; and
means for causing the light to traverse the sensing loop twice before traveling back to the means for passing and for extracting, the means for causing the light to traverse the sensing loop twice coupled to the means for passing and extracting and configured to change a polarization state of the light for each pass through the sensing loop.

31. The fiber optic ring interferometer of claim 30, wherein the interferometer is an interferometric fiber optic gyro.

32. The fiber optic ring interferometer of claim 30, wherein the means for causing the light to traverse the sensing loop twice comprises a PM combiner/splitter.

33. The fiber optic ring interferometer of claim 30, wherein the means for causing the light to traverse the sensing loop twice comprises a polarization beam splitter.

* * * * *